MAGNETIC PLATE MEMORY SYSTEM

Filed Aug. 26, 1960 4 Sheets-Sheet 1

INVENTORS
WILLIAM G. RUMBLE &
WESTLEY V. DIX
BY
Carl V. Olson
ATTORNEY

INVENTORS
WILLIAM G. RUMBLE &
WESTLEY V. DIX
BY
Carl V. Olson
ATTORNEY

INVENTORS
WILLIAM G. RUMBLE &
WESTLEY V. DIX
BY
Carl V. Olson
ATTORNEY

INVENTORS
WILLIAM G. RUMBLE &
WESTLEY V. DIX
BY
Carl V. Olson
ATTORNEY

United States Patent Office 3,171,103
Patented Feb. 23, 1965

3,171,103

MAGNETIC PLATE MEMORY SYSTEM

William G. Rumble, Van Nuys, and Westley V. Dix, Canoga Park, Calif., assignors to Radio Corporation of America, a corporation of Delaware Filed Aug. 26, 1960, Ser. No. 52,177
9 Claims. (Cl. 340—174)

This invention relates to an apertured magnetic plate memory system for use in electronic data processing machines, and more particularly to a random access memory system, either linear select or coincident current, wherein a hole pair is employed to store each information bit.

Apertured ferrite plate memory systems commonly employ one aperture (that is, hole) in storing an information bit. A stored information bit is a "1" or "0" as represented by remanent magnetic flux circling the aperture in one sense or the other. A number of identical apertured plates may be stacked, with one plate for each digit, and read-write drive lines or wires are threaded through corresponding apertures of all the plates in the stack. The latter arrangement is termed in the art as linear select or word organized, a word being a group of binary digits.

Memory plates of ferrite material are insulators and may be provided with a printed digit winding linking all the apertures of a given plate. The digit winding may be used for both writing in and reading out information positionally selected by the read-write drive lines.

Ideally, the writing of information by establishing a remanent magnetic field around one aperture, and the reading out of this information, should be done without any disturbing effect on the field around any other aperture in the system. In actual practice, there is undesired "cross-talk" or interaction between various elements of the memory. Measures taken to minimize the detrimental interaction have involved increasing the spacing between apertures and maintaining a close tolerance on the amplitude and duration of the operating pulses.

It is an object of this invention to provide an improved random access magnetic plate memory system which is relatively free of disturbing interaction between storage elements of the system.

It is another object to provide a magnetic plate memory system capable of operation with high reliability over a wide range of ambient temperatures.

It is a further object to provide a magnetic plate memory system which operates reliably in the linear select, partial switching mode with very short, high-amplitude drive pulses of several times normal coercivity.

These and other objects and advantages of the invention are accomplished by a construction wherein a separate pair of adjacent holes is provided in a magnetic plate for the storage of each information bit. The plate is of a magnetic material, such as ferrite, having a substantially rectangular hysteresis loop characteristic.

A plurality of hole pairs may be provided in a single plate, and may be arranged in rows and columns. A digit winding, which may be a printed winding, links the hole pairs of one plate, and read-write drive lines or windings for selection purposes link selected hole pairs. The windings are organized so that a "1" can be written into a selected hole pair by establishing a relatively greater flux in a given direction around the upper hole of that hole pair, and a "0" can be written by establishing a relatively greater flux in a given direction around the lower hole of that pair.

A number of plates may be stacked side-by-side with one plate for each digit, and with read-write drive lines threaded through corresponding hole pairs of all of the plates.

The invention will be described in greater detail with reference to the accompanying drawings, wherein.

Figure 1:
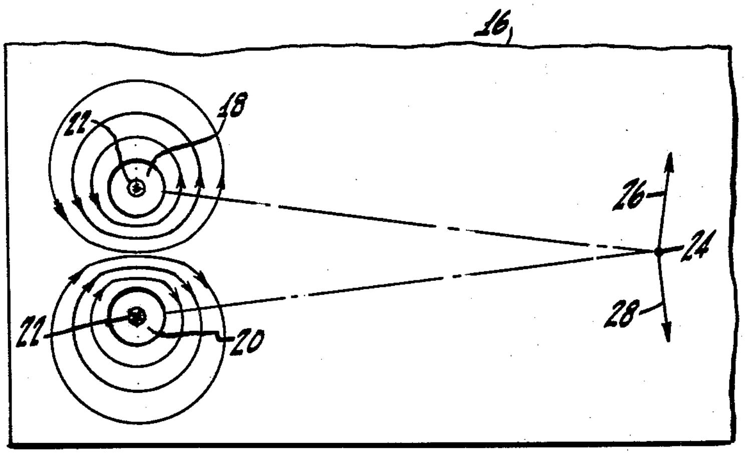
FIG. 1 is a diagram which will be used in explaining the advantages of a magnetic memory plate having two holes per information bit.

FIG. 1 is a diagrammatic plan view of a magnetic plate 16 of ferrite material having a substantially rectangular hysteresis loop characteristic, and having two apertures or holes 18 and 20. An electrical conductor 22 carries current up through the hole 18, and down through hole 20. The magnetic flux in the ferrite plate 16 resulting from the flow of electrical current through the conductor 22 is represented by the closed circles around the holes, the direction of the flux being represented by the arrowheads on the circles. It will be noted that the number of flux lines is limited by the crowding of flux lines in the plate material between the holes 18 and 20. When the magnetic material between the holes becomes saturated with flux, there is an inherent limiting of the number of flux lines extending from the holes to other areas of the plate where they would disturb the information stored in the other holes (not shown). An increase of drive current beyond that producing saturation of the middle area of the plate cannot cause further spreading of flux. This limitation of the flux which results from the use of an adjacent hole pair for each bit is to be contrasted with the absence of such limitation of flux lines where a single hole is used for each information bit. In the latter case, the flux lines can extend outwardly with increased current drive from each hole to the extent that they interfere with the information stored in adjacent holes. Therefore, in a single-hole-per-bit system, the amplitudes of the operating pulses (current or voltage) must be limited to avoid the otherwise resulting interference. The undesired interference is further increased as the ambient temperature increases because the hysteresis characteristic of the material becomes less rectangular.

FIG. 1 also illustrates how the magnetic fields produced by drive currents through a hole pair substantially cancel at points in the plate remote from the hole pair. At the point 24 the magnetic field around the hole 18 is represented by the vector 26, and the magnetic field around the hole 20 is represented by the vector 28. It will be seen that the directions of the equal vectors 26 and 28 are such as to substantially cancel at the point 24. This cancellation of the magnetic fields around a hole pair is a desirable effect not obtained in a memory plate employing one hole per information bit. For the foregoing reasons it is seen that a magnetic memory plate employing an adjacent hole pair for each information bit is much less subject to interference between bit storage elements than a system including one hole per bit. Stated another way, the relative isolation between two-hole-per-bit memory elements in a magnetic plate permit operation of the memory plate with reliability over a wide range of ambient temperatures and under conditions involving operating pulses which result in driving forces that are several times the normal coercivity.

Figure 2:
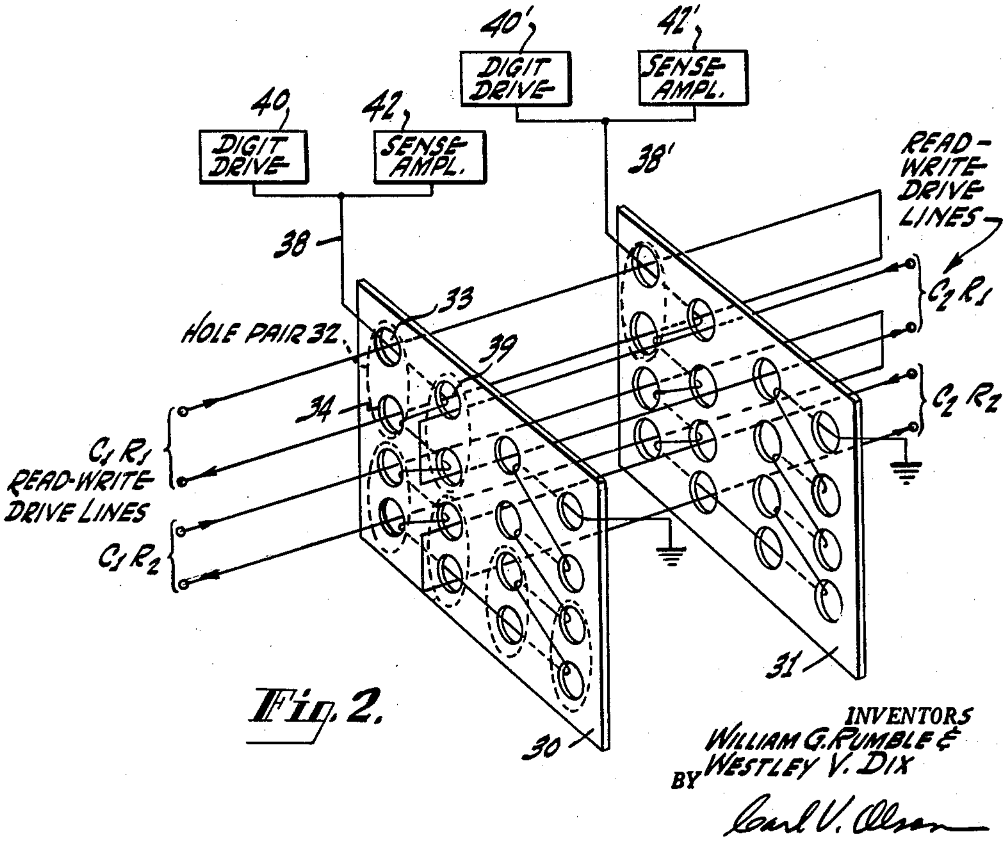
FIG. 2 is a diagram of a random access, linear select magnetic plate memory system constructed according to the teachings of this invention.
Figure 3:
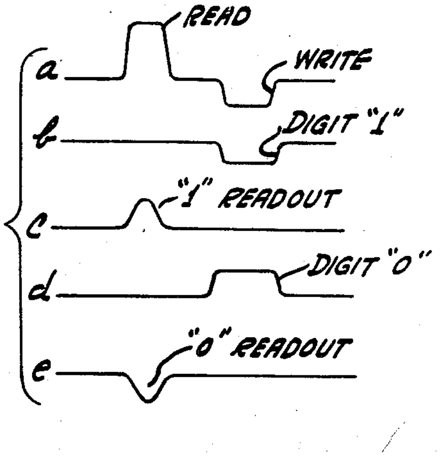
FIGS. 3, 4, 5, 6 and 7 are diagrams which will be used in explaining the operation of the system of FIG. 2.
Figure 4:
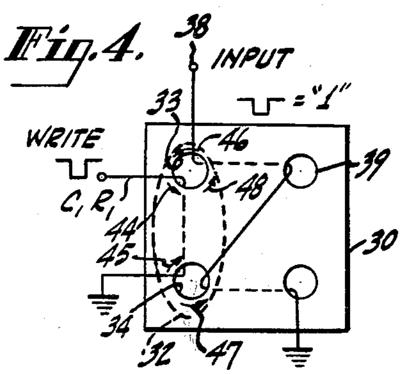

FIG. 2 illustrates a random access, linear select ferrite magnetic plate memory system including a hole pair for storing each information bit. A relatively large number of identical apertured plates may be employed, two of which are illustrated at 30 and 31. The plate 30 is provided with hole pairs 32 arranged in four columns each having two hole pairs, and rows each having four hole pairs. A read-write drive line, or word selector line, $C_1R_1$ is threaded through the column 1, row 1, hole pairs 32 of all of the memory plates 30, 31. The drive line $C_1R_1$ is threaded to go into the upper hole 33 of the hole pair 32, and to come out of the lower hole 34 of the pair. A similar drive line $C_1R_2$ is provided for the column 1, row 2, hole pairs. Drive lines $C_2R_1$ and $C_2R_2$ are threaded in the reverse direction through the two hole pairs in the second column. Additional drive lines (not shown) are threaded in the hole pairs of the third and fourth columns. It will be understood that each ferrite plate may be provided with a larger number of hole pairs, such as sixteen hole pairs in each column and in each row, and that a large number of ferrite plates may be employed, such as twenty-eight.

Each apertured ferrite memory plate 30, 31 is provided with a digit or information control winding 38 which links all of the hole pairs in the particular plate. The digit winding 38 goes from a digit drive circuit 40 into the hole 33 of the hole pair 32, out of the hole 39 of the adjacent hole pair, into the hole 34 of the hole pair 32, and in like fashion through all the holes in the plate, to a point of reference potential such as ground. The digit winding 38 is preferably a winding which is printed on the electrically insulated ferrite plate. The winding is printed on both sides of the plate and also on the inner surfaces of all the holes to provide the conductive path illustrated by solid and dashed lines on plate 30 in the drawing. It will be observed that the winding scheme employed is one wherein the read-write drive line $C_1R_1$ goes into the hole 33 and out of the hole 34 of the hole pair 32; and that the digit winding 38 goes into the upper hole 33 and into the lower hole 34 of the hole pair 32. The scheme may be described as one wherein the read-write drive line and the digit winding go through one hole of the hole pair in the same direction and go through the other hole of a hole pair in opposite directions. This scheme is followed in the windings of all of the hole pairs in the system. The arrangement is such that either the upper or the lower hole of a pair is magnetized (to represent a "1" or a "0") depending on the polarity of the pulse applied to the digit winding.

The printed digit winding 38 is connected to the digit drive circuit 40 for the purpose of writing information into the memory plate 30, and is also connected to a sense amplifier 42 for the purpose of reading out information from the memory plate 30. Every other memory plate, such as plate 31, is provided with a similar printed digit winding which is connected to a similar digit drive circuit and a similar sense amplifier. A separate memory plate is provided for every digit of the "word" that the memory system is designed to store.

Reference will now be made to FIGS. 3 through 7 for an explanation of how information is written into and read out of an individual hole pair 32 in a memory plate 30. A negative "write" pulse as shown in FIG. 3*a* is applied to the read-write winding $C_1R_1$ in FIG. 4. The direction of the winding and the polarity of the input pulse is such that the resulting magnetizing force around the hole 33 is in the direction to produce flux represented by the arrow 44, and the force around the hole 34 is in the direction to produce flux represented by the arrow 45. When it is desired to write the digit "1" into the hole pair 32, a negative pulse as represented by the wave of FIG. 3*b* is applied to the digit winding 38 concurrently with the write pulse applied to winding $C_1R_1$. The resulting magnetizing force around the hole 33 is in a direction to produce flux represented by the arrow 46, and the resulting magnetizing force around the hole 34 is in a direction to produce flux represented by the arrow 47. It will be seen that the two forces around the hole 34 are in directions to cancel each other, and that the forces around the hole 33 are in the same direction to produce a resultant counter-clockwise flux 48.

Figure 5:
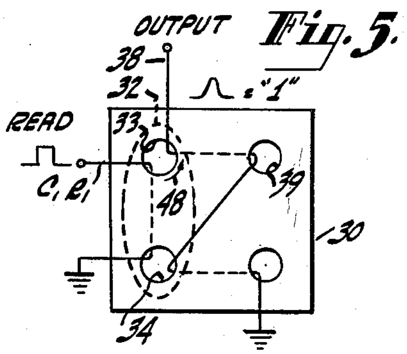

When it is desired to read out the information stored in the hole pair 32, a positive "read" pulse according to FIG. 3*a* is applied to the read-write winding $C_1R_1$ as illustrated in FIG. 5. When this is done, a positive pulse as represented by the wave of FIG. 3*c* is induced in the digit winding 38 to indicate that the information stored in the hole pair was a "1." The positive polarity of the pulse read out is determined, for the given winding linkage, by the presence of a value of counter-clockwise remanent flux 48 around the hole 33, which is large compared with the clockwise flux (which may be zero) around the hole 34.

Figure 6:
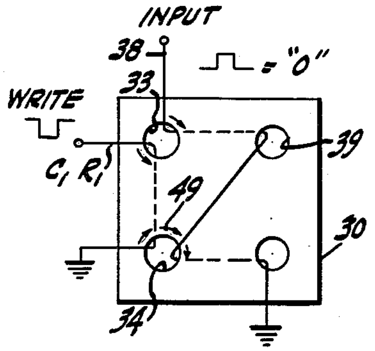
Figure 7:
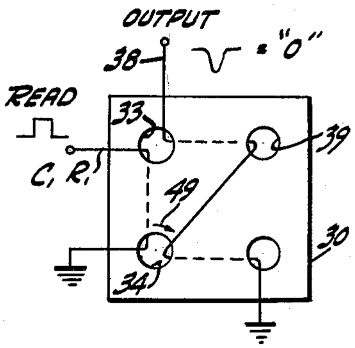

FIGS. 6 and 7 illustrate what happens when a "0" is written into and read out of the hole pair. In FIG. 6, a negative "write" pulse is applied to the read-write winding $C_1R_1$, and a positive pulse corresponding to "0" is simultaneously applied to the digit winding 38. The magnetizing forces around the hole 33 tend to cancel or subtract from each other, and the magnetizing forces around the hole 34 add to provide a resultant remanent flux represented by arrow 49 in the clockwise direction around the hole 34. Then, referring to FIG. 7, the information stored in the hole pair is read out by applying a positive read pulse to the read-write winding $C_1R_1$. The remanent flux 49 around the hole 34 is reversed by the read pulse and a negative polarity output pulse representing "0" is induced in the digit winding 38. It is thus apparent that the digit winding 38 provides an output pulse corresponding with the information bit previously written into the particular hole pair. After each read operation, the remanent flux about the apertures 33 and 34 is in standardized directions and ready for a subsequent write operation. Of course, the assignment of conditions corresponding to a stored "1" and a stored "0" are purely arbitrary and may be reversed.

Figure 8:
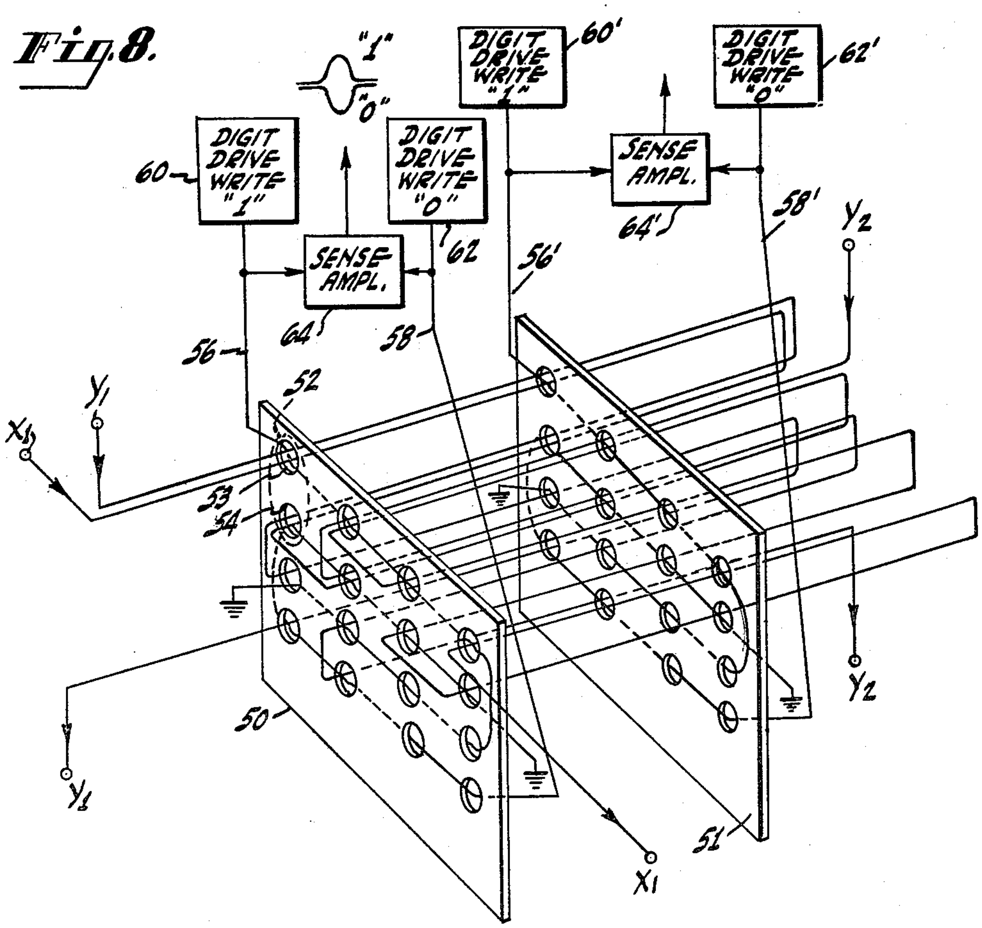
FIG. 8 is a diagram of a random access, coincident current magnetic plate memory system according to the invention.
Figure 9:
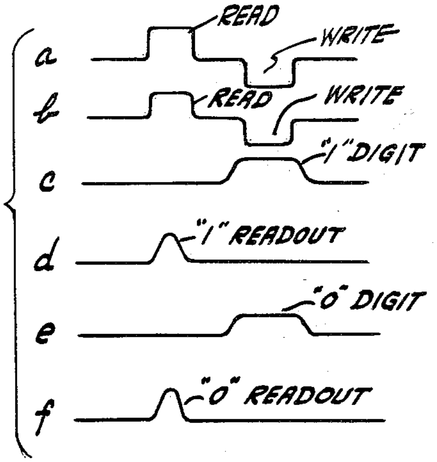
FIGS. 9, 10, 11, 12 and 13 are diagrams which will be used in explaining the operation of the system of FIG. 8.

FIG. 8 shows a random access, coincident current ferrite plate memory wherein two holes are employed for the storage of each information bit. Two ferrite digit plates 50 and 51 are illustrative of many that may be included in a memory unit. Each ferrite digit plate is provided with hole pairs 52 arranged in rows and columns, the illustration including two hole pairs in each column and four hole pairs in each row. Only eight hole pairs per plate are shown for clarity of illustration. A read-write drive line $Y_1$ is threaded through all the hole pairs in the first column, and a read-write drive line $Y_2$ is threaded through all of the hole pairs in the second column. The read-write drive lines for the additional columns are omitted from the drawing. A read-write drive line $X_1$ is threaded through all of the hole pairs in the first row. Additional read-write drive lines for the other rows are omitted from the drawing. It will be noted that the read-write drive lines $Y_1$ and $X_1$ are threaded in the same directions through the holes 53 and 54 of the hole pair 52. The hole pair 52 is selected for a reading or writing operation by the simultaneous application of pulses of the same polarity to the read-write lines $Y_1$ and $X_1$. Similarly, the hole pair in the first row of the second column is selected for reading or writing by the simultaneous application of pulses of the same polarity to the read-write lines $Y_2$ and $X_1$. The coordinate arrangement of the hole pairs and write-read drive leads permits the selection of any one of the hole pairs in all of the digit plates by the simultaneous energization of the appropriate read-write drive lines intersecting in that one pair.

Each ferrite digit plate 50, 51 is provided with a digit winding 56 linking the top holes of each hole pair, and a second digit winding 58 linking the bottom holes of each hole pair in the plate. The digit windings 56 and 58 may be formed by printed wiring techniques. The digit winding 56 goes into the top hole 53 of the hole pair 52 in the same direction as the read-write drive lines, and the digit winding 58 comes out of the lower hole 54 in the same direction as the read-write drive lines. It is thus apparent that the wiring scheme of FIG. 8 is different from that of FIG. 2 in that the differential effect on the two holes of a pair is accomplished by providing a centertap grounded digit winding having two portions 56 and 58. The portion 56 is threaded solely through all the top holes of the hole pairs, and the other portion 58 is threaded solely through the bottom holes of the pairs.

The digit winding 56 is connected to a digit drive circuit 60 for writing the information bit "1" into a hole pair simultaneously selected by pulses applied to the desired row and column read-write drive lines X and Y; and the digit winding 58 is connected to a digit drive circuit 62 for the purpose of writing the information bit "0" into a hole pair selected by the simultaneous application of pulses to the appropriate row and column read-write drive lines X and Y. The digit windings 56 and 58 are also employed for reading out stored information and are therefore both connected to a sense amplifier 64 which senses the polarity of the output pulse and provides an output indicating whether the information bit read is "1" or "0." Each of the ferrite digit plates is similarly provided with digit write circuits and a sense amplifier as is illustrated by the boxes 60′, 62′ and 64′ which are connected to the digit plate 51.

Figures 10, 11:
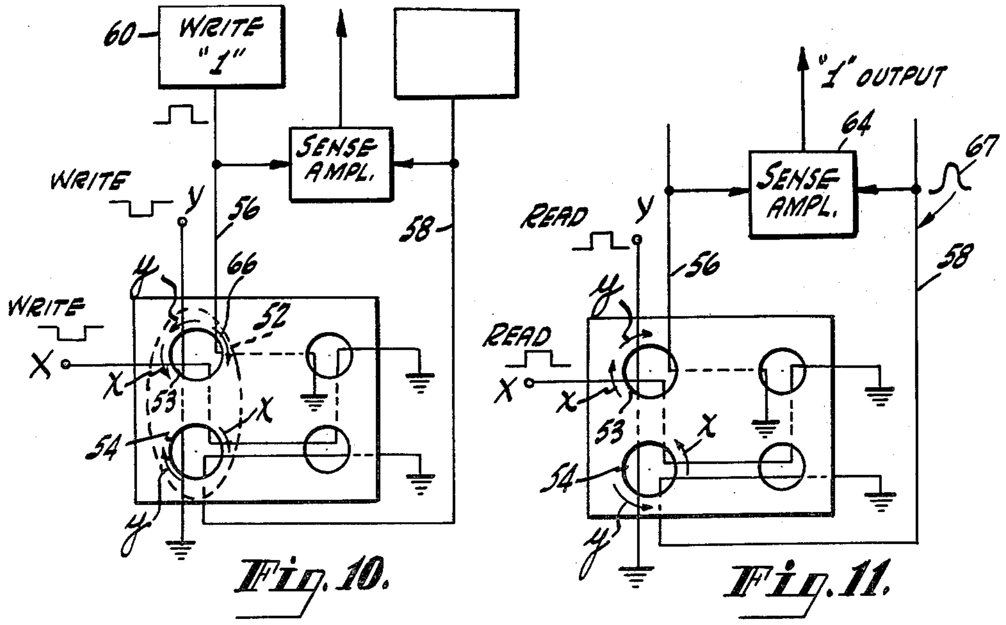

The operation of each individual hole pair in the system of FIG. 8 will now be explained with reference to FIGS. 9 through 13. Referring first to FIG. 10, and assuming that the initial remanent flux around hole 53 is clockwise, and around hole 54 is counter-clockwise; write drive pulses of negative polarity are simultaneously applied to the row and column read-write drive lines X and Y, with the result that there is a tendency to produce counter-clockwise flux around holes 53 and clockwise flux around hole 54, as represented by the arrows *x* and *y*. The combined amplitude of the pulses is sufficient to switch the directions of the fluxes around the holes 53 and 54. However, assuming that it is desired to write the bit "1" into the hole pair 52, a positive inhibit pulse from the digit circuit 60 is simultaneously applied through the digit winding 56. The direction and amplitude of the digit current linking the upper hole 53 is such as to produce a flux 66 in the opposite direction compared with the flux *x* and *y*. The digit winding 56 does not link the lower hole 54 at all. Therefore the flux around the upper hole 53 remains in the clockwise direction, and the flux in the lower hole 54 is switched to the clockwise direction.

FIG. 11 shows the manner in which the information stored in the hole pair is read out. Positive read drive pulses are simultaneously applied to the X and Y read-write drive lines. The combined amplitude of the read pulses is sufficient to switch the flux around the hole 54 from the clockwise direction to the counter-clockwise direction. The result is that a positive pulse 67 is induced in the digit winding 58 which is applied to sense amplifier 64 and is recognized as a "1" information bit. The wave forms of the signals utilized in the writing and the reading the "1" information bit may be as illustrated in FIGS. 9*a* through 9*d*.

Figures 12, 13:
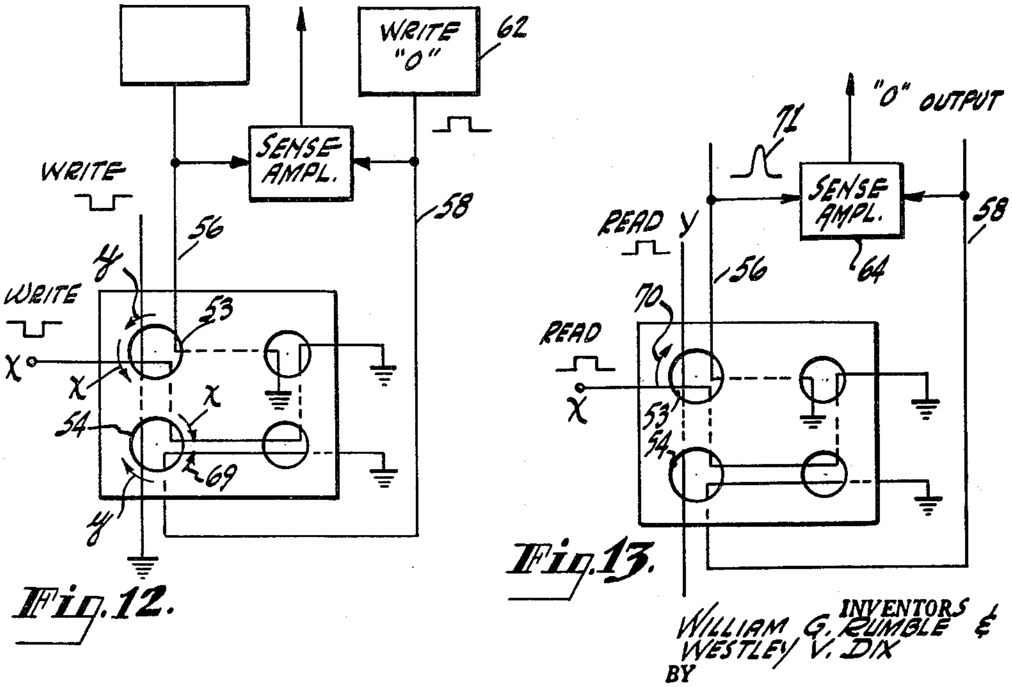

FIGS. 12 and 13 illustrate the operation of the system of FIG. 8 when a "0" is written into the memory, and is then subsequently read out of the memory. Negative write drive pulses are simultaneously applied to the X and Y read-write drive lines. A positive digit pulse representing "0" is applied from the digit drive circuit 62 through the digit winding 58 which links the lower hole 54 of the hole pair, the polarity of the pulse being in a direction to produce a flux 69. Thus the positive digit pulse inhibits the switching of flux around the hole 54, while the flux around the upper hole 53 is switched by the X and Y drive pulses to saturation in the counter-clockwise direction.

FIG. 13 shows how the "0" information bit is read out of the hole pair by applying positive read drive pulses simultaneously to the read-write drive lines X and Y. The flux around the whole 53 is switched to the clockwise direction 70 and a positive pulse 71 is induced into the digit winding 56 and is applied to the sense amplifier 64 which recognizes the positive pulse on lead 56 as corresponding to a "0" information bit. The waveforms *a*, *b*, *e* and *f* of FIG. 9 apply to the writing and reading operation illustrated in FIG. 12 and FIG. 13.

It will be apparent that various changes can be made in the polarities of the various pulses and in the connections of the windings without changing the basic mode of operation of the two-hole per bit memory system.

It is apparent from the foregoing that there is provided according to this invention a novel and useful random access magnetic plate memory system which employs two holes per bit for the purpose of reducing interaction between the many storage elements in the system. The invention is useful in both linear select and coincident current types of plate memory system.

What is claimed is:

1. In a magnetic memory system, the combination comprising a plurality of digit memory plates of magnetic material with rows and columns of hole pairs, each hole pair constituting two adjacent holes in the same plate for the storage of one information bit, each of said plates being provided with a printed digit drive winding going in the same direction through both holes of each hole pair by means of an intermediate passage in the other direction through a hole of another hole pair, and a plurality of read-write drive lines threaded through corresponding holes of all of said plates with the lines going in opposite directions through the holes of each hole pair.

2. A magnetic memory system comprising a plurality of digit memory plates of magnetic material with rows and columns of hole pairs on each plate, each hole pair constituting a storage element for one bit, each of said plates being provided with a printed digit winding going in the same direction through both holes of each hole pair by means of an intermediate passage in the other direction through a hole of another hole pair, a plurality of read-write drive lines threaded through corresponding hole pairs of all of said plates with the lines going in opposite directions through the holes of each hole pair, means to apply pulses of one polarity to said read-write drive lines and pulses of positive or negative polarity to said digit windings to write information in said memory system, and means to apply pulses of the opposite polarity to said read-write drive lines to read out the stored information on said digit windings.

3. A magnetic memory system according to claim 2 wherein one corresponding hole pair in each of said plates is linked by one of said plurality of read-write drive lines, whereby to provide a linear select memory system.

4. A magnetic memory system according to claim 2 wherein said read-write drive lines include one line for each row of hole pairs and one line for each column of hole pairs, whereby to provide a coincident current memory system.

5. A magnetic memory system according to claim 4 wherein each of said digit windings is constituted by a first portion linking the top holes of each hole pair, and by a second portion linking the bottom hole of each hole pair, and wherein a digit drive pulse of one polarity is applied to said first portion and a digit drive of the opposite polarity is applied to said second portion.

6. In a coincident current magnetic memory system, the combination comprising an apertured memory plate of magnetic material having a substantially rectangular hysteresis loop characteristic, said memory plate having rows and columns of hole pairs, a plurality of row and column read-write drive lines passing in opposite directions through the two holes of respective hole pairs, each hole pair constituting two adjacent holes in the same plate for the storage of one information bit, whereby read-write pulses applied to a row drive line and a column drive line produce magnetizing forces which tend to cancel at points removed from the selected hole pair, and digit winding means linking all the holes of said memory plate, said digit winding means for each memory plate including one conductor linking all the upper holes of each hole pair and including a second conductor linking all the lower holes of each hole pair.

7. In a magnetic system, the combination comprising an apertured plate of magnetic material having rows and columns of hole pairs, each hole pair constituting two adjacent holes in the same plate for the storage of one information bit, selector windings and digit windings arranged so that each hole pair has a selector winding going through both holes of the pair and has a digit winding going through both holes of the pair by means of an intermediate passage in the other direction through a hole of another hole pair, means when writing a "1" to apply selector and digit currents to said respective windings so that selector and digit currents go in the same direction through only one hole of the pair, and when writing a "0," selector and digit currents go in the same direction through only the other hole of the pair.

8. In a magnetic system, the combination comprising an apertured plate of magnetic material having rows and columns of hole pairs each having first and second holes, each hole pair constituting two adjacent holes in the same plate for the storage of one information bit, selector windings and digit windings arranged so that each hole pair has a selector winding going through both holes of the pair in opposite directions and has a digit winding going through both holes of the pair in the same direction by means of an intermediate passage in the other direction through a hole of another hole pair, means when writing a "1" to apply selector and digit currents to said respective windings so that selector and digit currents go in the same direction through the first hole of the pair and go in opposite directions through the second hole of the pair, and when writing a "0," selector and digit currents go in the same direction through the second hole of the pair and go in opposite directions through the first hole of the pair.

9. In a magnetic system, the combination comprising an apertured plate of magnetic material having rows and columns of hole pairs each having first and second holes, each hole pair constituting two adjacent holes in the same plate for the storage of one information bit, selector windings and digit windings arranged so that each hole pair has a selector winding going through both holes of the pair in opposite directions and has a centertapped digit winding having one portion going from the centertap through said first hole of the pair in one direction and having another portion going from the centertap through said second hole of the pair in the opposite direction, means when writing a "1" to apply selector and digit currents to said respective windings so that selector and digit currents go in the same direction through only said first hole of the pair, and when writing a "0," selector and digit currents go in the same direction through only said second hole of the pair.

References Cited by the Examiner

UNITED STATES PATENTS

| | | | |
|---|---|---|---|
| 2,912,677 | 11/59 | Ashenhurst et al. | 340—174 |
| 2,942,240 | 6/60 | Rajchman et al. | 340—174 |
| 2,952,840 | 9/60 | Ridler et al. | 340—174 |
| 2,988,732 | 6/61 | Vinal | 340—174 |
| 3,017,614 | 1/62 | Rajchman | 340—174 |

OTHER REFERENCES

Publication I: Proceedings of the IRE, March 1957, pp. 325–334.

IRVING L. SRAGOW, *Primary Examiner.*

JOHN F. BURNS, *Examiner.*